US012657520B2

(12) United States Patent
Goodsitt et al.

(10) Patent No.: US 12,657,520 B2
(45) Date of Patent: Jun. 16, 2026

(54) SYSTEMS AND METHODS FOR ASSISTIVE DOCUMENT RETRIEVAL IN DATA-SPARSE ENVIRONMENTS

(71) Applicant: Capital One Services, LLC, McLean, VA (US)

(72) Inventors: Jeremy Goodsitt, Champaign, IL (US); Galen Rafferty, Mahomet, IL (US); Samuel Sharpe, Cambridge, MA (US); Austin Walters, Savoy, IL (US); Kenny Bean, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 655 days.

(21) Appl. No.: 18/307,759

(22) Filed: Apr. 26, 2023

(65) Prior Publication Data

US 2024/0362529 A1    Oct. 31, 2024

(51) Int. Cl.
*G06N 20/00* (2019.01)
*G06F 40/205* (2020.01)
*G06F 40/289* (2020.01)
*G06F 40/35* (2020.01)

(52) U.S. Cl.
CPC ........... *G06N 20/00* (2019.01); *G06F 40/205* (2020.01); *G06F 40/289* (2020.01); *G06F 40/35* (2020.01)

(58) Field of Classification Search
CPC ..... G06N 20/20; G06F 40/205; G06F 40/289; G06F 40/35; G06F 40/30
See application file for complete search history.

(56) References Cited

U.S. PATENT DOCUMENTS

| | | | | |
|---|---|---|---|---|
| 11,373,045 B2 * | 6/2022 | Bealby-Wright | ....... | G10L 15/18 |
| 11,487,948 B2 * | 11/2022 | Kaur | ....................... | G06N 3/096 |
| 11,699,435 B2 * | 7/2023 | Mondal | ............. | G06F 16/90332 |
| | | | | 704/275 |
| 11,929,066 B2 * | 3/2024 | Zhang | ................... | G10L 15/197 |
| 2021/0142103 A1 * | 5/2021 | Xie | ........................... | G06N 5/04 |
| 2021/0374353 A1 * | 12/2021 | Zhang | ..................... | G06F 40/30 |
| 2023/0136527 A1 * | 5/2023 | Zhang | ..................... | G06F 40/35 |
| | | | | 704/9 |
| 2024/0303439 A1 * | 9/2024 | Shaikh | .................... | G06F 40/30 |

OTHER PUBLICATIONS

Sahar Moradizeyveh, Intent Recognition in Conversational Recommender Systems, arXiv, 2022. (Year: 2022).*

* cited by examiner

*Primary Examiner* — Kris E Mackes
(74) *Attorney, Agent, or Firm* — Foley & Lardner LLP

(57) ABSTRACT

Methods and systems are described herein for novel uses and/or improvements to artificial intelligence applications for data-sparse environments. As one example, methods and systems are described herein for overcoming the problem of determining an appropriate digital asset to recommend to a user in real-time based on training data that may be shared between multiple intents (e.g., as would be found in responses to textual, verbal, and/or other real-time communications). In particular, the methods and systems overcome this technical problem by using an artificial intelligence trained to identify specific verbiage of a user to display digital assets corresponding to a user's intent thereby increasing productivity, organization, and collaboration, and reducing frustration.

20 Claims, 4 Drawing Sheets

200

300

400

SYSTEMS AND METHODS FOR ASSISTIVE DOCUMENT RETRIEVAL IN DATA-SPARSE ENVIRONMENTS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming, and a manual task. These technical problems may present an inherent problem with attempting to use an artificial intelligence-based solution in determining an appropriate digital asset to recommend to a user in real-time.

SUMMARY

Methods and systems are described herein for novel uses and/or improvements to artificial intelligence applications for data-sparse environments. As one example, methods and systems are described herein for overcoming the problem of determining an appropriate digital asset to recommend to a user in real-time based on training data that may be shared between multiple intents (e.g., as would be found in responses to textual, verbal, and/or other real-time communications). In particular, the methods and systems overcome this technical problem by using an artificial intelligence trained to identify specific verbiage of a user to display digital assets corresponding to a user's intent, thereby increasing productivity, organization, and collaboration, and reducing frustration.

For example, artificial intelligence models require copious amounts of data to base digital asset recommendations on, and in most scenarios, the received information (e.g., a user action launching a real-time communication application) does not provide much information about the intent of the user. However, in many applications that provide real-time responses, the information received is likely the same in most instances despite the user having different intents (e.g., the user may log into the real-time communication application in the same manner irrespective of the user's current intent).

To overcome these technical deficiencies in adapting artificial intelligence models for this practical benefit, methods and systems disclosed herein include an artificial intelligence model that is trained to identify specific verbiage of a user that may both relate to the specific intent of that user and is not commonly used by others. For example, the artificial intelligence model may identify specific subsets of a phrase associated with the user's intent and compare the subsets to subsets of other users. Identifying an anomaly between the subsets of phrases may indicate a user's specific intent, thereby overcoming the challenge of identifying user intent based on information received by the artificial intelligence model. For example, the system may identify particular words that are used by the user when the user has a particular intent. The system may then compare those particular words to words commonly used by other users. In response to finding that the particular word is not used (or not used with a particular frequency) by other users and is thus indicative of a user's specific verbiage, the system may determine that any instances of this word used by the user are indicative of that user's specific intent. Accordingly, the methods and systems provide the practical benefit of being able to provide digital assets at a relevant time, thereby increasing productivity, organization, and collaboration and reducing frustration.

In some aspects, methods and systems are designed to generate for display a digital asset corresponding to the known intent (e.g., a digital asset recommendation) using artificial intelligence models in data-sparse environments. The method may receive, at a user interface, a first action, wherein the first action comprises a phrase entered by a user. The method may determine a first subset of the phrase. The method may determine whether the first subset corresponds to a first labeled subset in a plurality of labeled subsets, wherein each labeled subset of the plurality of labeled subsets corresponds to one of respective known intents of the user, and wherein the plurality of labeled subsets is based on an artificial intelligence model. The artificial intelligence model may be trained to determine that a respective labeled subset of the plurality of labeled subsets was used when the user had a respective known intent. The artificial intelligence model may be trained to determine that the respective labeled subset was not used at a threshold frequency by other users, and based on the respective labeled subset not being used at the threshold frequency by other users, assign the respective labeled subset as corresponding to the respective known intent for the user. The method may, in response to determining that the first subset corresponds to the first labeled subset in the plurality of labeled subsets, determine the user has a first known intent corresponding to the first labeled subset, and generate for display, on the user interface, a first digital asset corresponding to the first known intent.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
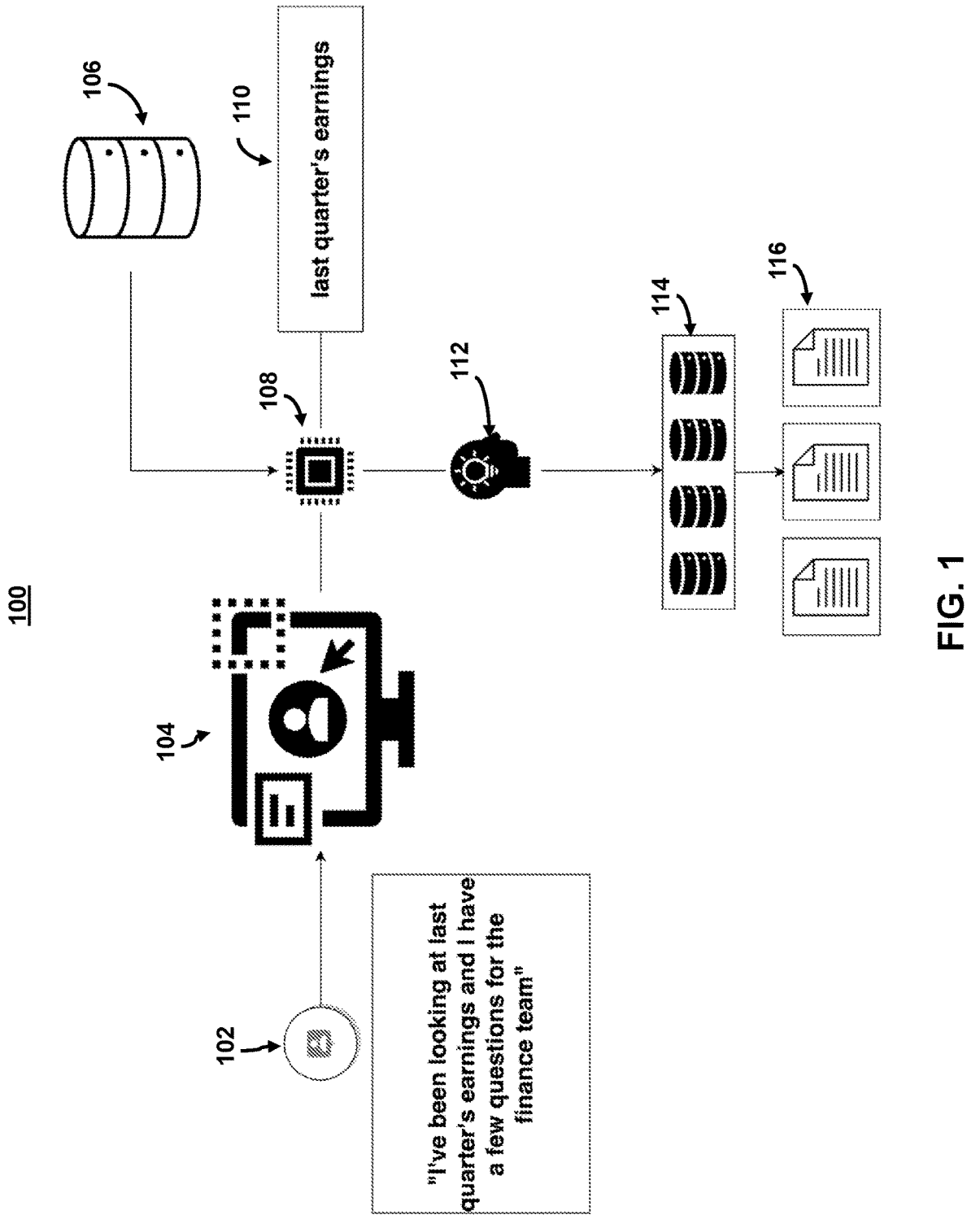
FIG. 1 shows an illustrative diagram for enabling a system to present digital assets for reference during an interaction in a data-sparse environment, in accordance with one or more embodiments.

FIG. 1 shows an illustrative diagram enabling a system to present digital assets for reference during an interaction in a data-sparse environment, in accordance with one or more embodiments. For example, system 100 may include model 108 which may help to enable a system to present digital assets for reference during an interaction in a data-sparse environment (e.g., a real-time communication application). For example, FIG. 1 illustrates how the artificial intelligence model is trained to identify user-specific verbiage of a user that may relate to the specific intent of that user. For example, the system may identify particular words that are used by the user when the user has a particular intent. The system may then compare those particular words to words commonly used by other users. In response to finding that the particular word is not used (or not used with a particular frequency) by other users and is thus indicative of a user's specific verbiage, the system may determine that any instances of this word used by the user is indicative of that user's specific intent. As such, the system may enable a system to present digital assets for reference during an interaction in a data-sparse environment. Being able to provide digital assets at a relevant time increases productivity, organization, collaboration and reduces frustration. The system may be able to increase productivity by providing quick and easy access to relevant digital assets and thereby reduce the time spent searching for the appropriate document in past emails, databases, or file systems. The system may lead to better organization as the system ensures that the most relevant files are presented to the user, thereby reducing the risk of organizational errors (e.g., viewing an old version of a document). The system may also lead to improved collaboration in some instances. The system makes it easier to collaborate in real-time because the digital asset can be quickly referenced in real time among participants (e.g., everyone can see the same document). The system may also reduce user frustration as it can be stressful and frustrating when searching for relevant documents when in a meeting in real time.

Model 108 may receive a first action by the user (e.g., action 102). Action 102 may be an interaction with a chatbot or a phone call. Action 102 may comprise a phrase that is input into a data-sparse environment (e.g., real-time communication application 104). For example, action 102 may be an interaction with a video-conferencing application and comprise a phrase that is a transcribed voice recording. For example, action 102 may comprise a phrase that is a transcribed voice recording, input into real-time communication application 104, that says, "I've been looking at last quarter's earnings and I have a few questions for the finance team." Model 108 may receive the transcribed voice recording from real-time communication application 104. Model 108 may identify a subset of the phrase which includes a string of one or more alphanumeric characters (e.g., phrase subset 110). Model 108 may determine whether phrase subset 110 corresponds to a labeled subset in a plurality of labeled subsets in database 106. The database may be maintained by the system and contain known intents as well as the corresponding subset to these known intents.

Model 108 may determine that a respective labeled subset of the plurality of labeled subsets was used when the user has a respective known intent (e.g., respective known intent 112). For example, the system may determine that a user had respective known intent 112 based on action 102. For example, the system may determine the user had a respective known intent based on entered text, dictated inputs, interactions with the user interface (e.g., clicking a button or scrolling), inputs through the camera or microphone, gyroscopic data (e.g., holding a user device in a certain way, shaking the user device, or resting the user device on a table), opening a specific digital asset, or altering the device settings. Model 108 may determine that the respective labeled subset was not used at a threshold frequency by other users. For example, the system may filter out commonly used terms, which may apply to numerous different intents. Filtering out common terms may eliminate any weighting based on terms that may relate to different potential intents of the user. If the respective labeled subset is not being used at the threshold frequency by other users, the system may assign the respective labeled subset as corresponding to the respective known intent (e.g., respective known intent 112) for the user.

After determining that phrase subset 110 corresponds to a labeled subset in database 106 and determining that the user has a respective known intent 112, model 108 may query one or more additional databases (e.g., databases 114) based on respective known intent 112 to identify digital assets corresponding to the known intent of the user (e.g., digital asset recommendations 116). For example, the model may identify that the intent from phrase subset 110 ("last quarter's earnings") is that the user wants more information pertaining to the last quarter's earnings. Subsequently, model 108 may query databases 114 digital assets corresponding to information pertaining to last quarter's earnings (e.g., digital asset recommendations 116) and display them on a user interface accordingly.

The system may be used to identify actions on a user interface. In disclosed embodiments, an action may include a text string input into a chatbot, transcribed from a phone call, or dictated into a text field. In some embodiments, the action may comprise a phrase entered by the user. In some embodiments, the phrase entered by the user may comprise a subset of the phrase. For example, an action may be a user speaking to a second party on a phone call. The action may include a phrase a user said on the phone call. For example, a user may say a phrase on a phone call such as, "we need to look at last quarter's earnings." The phrase may comprise a subset of the phrase such as "last quarter's earnings."

The system may be used to identify the intent of a phrase by using respective known intents of the user. In disclosed embodiments, a labeled subset may correspond to one of respective known intents of the user. The respective known intents may be assigned to a subset of a phrase by an artificial intelligence. For example, the system may determine that a user had a respective known intent based on one or more user inputs of a user during a device session. For example, a phrase may be associated with a respective known intent. For example, if a phrase is "we need to look at last quarter's earnings" the system may associate the subset of the phrase "we need to look at" as a user's intent to view information.

The system may be used to generate digital asset recommendations in data-sparse environments. In disclosed embodiments, a data-sparse environment may include real-time communication applications such as instant messaging applications, video-conferencing applications, Voice of IP (VoIP) applications, or online gaming platforms. For example, the system may generate digital asset recommendations to present to a user who is using a data-sparse environment such as a video-conferencing application. As another example, the system may be used in a customer support setting. The customer may discuss a recent purchase and the system may recognize the intent of the customer to share information pertaining to a recent purchase with the customer support representative. The system may generate digital asset recommendations to present regarding the customer's recent purchases.

The system may be used to receive user inputs that correspond to a user-selected intent identifier. In disclosed embodiments, a user-selected intent identifier may allow a user to access particular content. For example, the user-selected intent identifiers may be selected by a user. For example, the system may receive user selections of both an intent of the user (e.g., what content digital asset, etc.) as well as a user-selected intent identifier for that intent (e.g., a user may input a keyword or other identifier that indicates to the system that the user has a particular intent).

The system may be used to determine that a user had a respective known intent based on one or more user inputs of a user during a device session. For example, an input frequency may include the number of times a user enters a phrase when the user has the respective known intent. For example, the system may determine whether or not the respective labeled subset appeared in a threshold number of the text strings entered by the user when the user had the respective known intent. For example, the system may determine if the respective labeled subset appeared in many text strings entered by the user and determine if they correspond to the same respective known intent.

Figure 2:
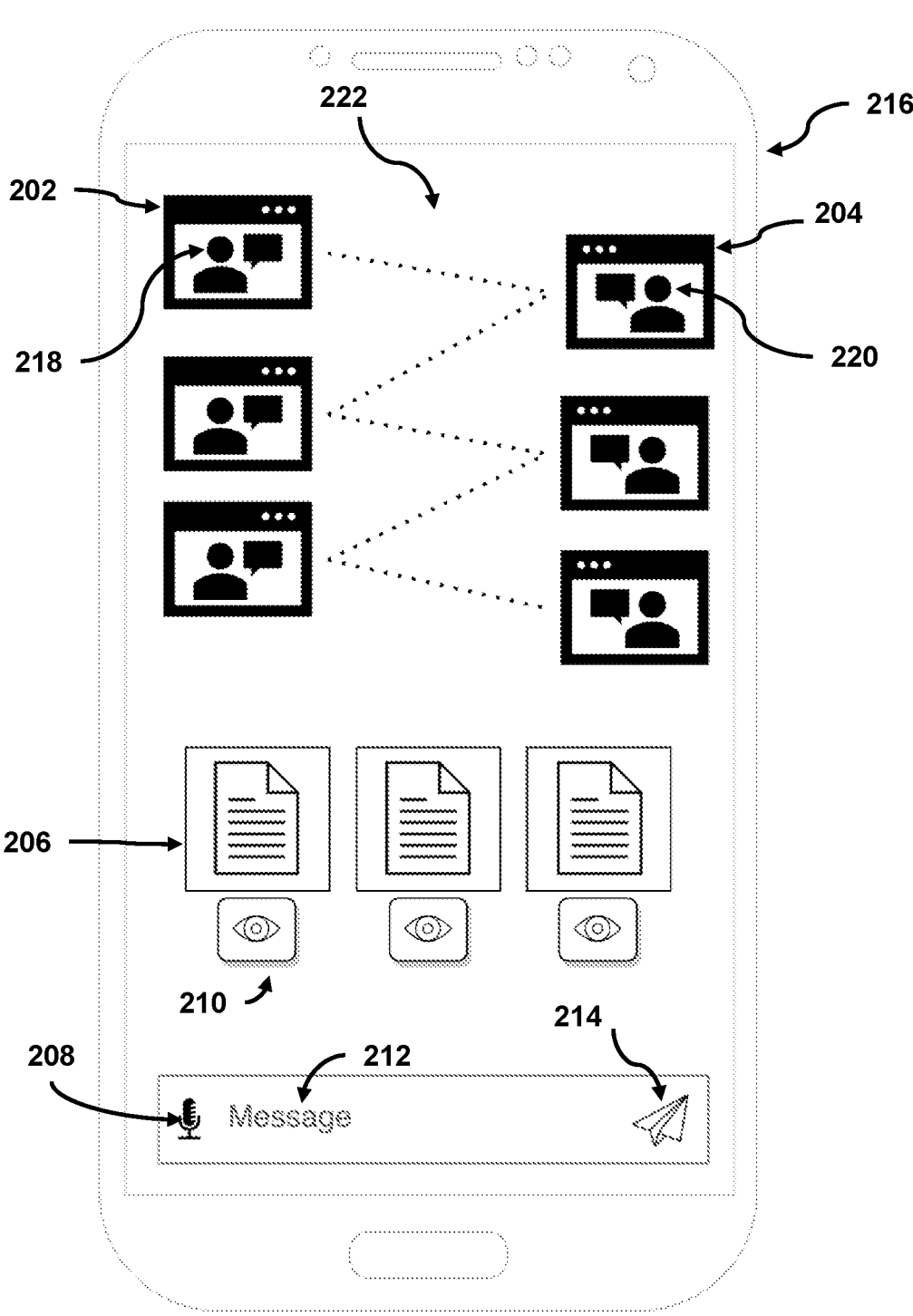
FIG. 2 shows an illustrative diagram for identifying user-specific verbiage of a user that may relate to the specific intent of that user, in accordance with one or more embodiments.

FIG. 2 shows an illustrative diagram for identifying user-specific verbiage of a user that may relate to the specific intent of that user, in accordance with one or more embodiments. System 200 may use an artificial intelligence model to recommend a digital asset to a user based on the user's intent by training the AI to identify user-specific verbiage of a user that may relate to the specific intent of that user, thereby overcoming the challenge traditional systems face. Traditional systems may have trouble deriving information about the intent of the user because the copious amounts of data traditionally received by a model and used to base recommendations on (e.g., a user action launching a real-time communication application) lacks the necessary characteristics to derive information about a user's intent. Furthermore, the data received by a traditional system is likely the same in most instances despite the user having different intents (e.g., the user logs into the real-time communication application in the same manner irrespective of the user's current intent). As such, artificial intelligence models face a fundamental technical hurdle in generating accurate and precise recommendations in data-sparse environments. For example, the system may identify particular words that are used by the user when the user has a particular intent. The system may then compare those particular words to words commonly used by other users. In response to finding that the particular word is not used (or not used with a particular frequency) by other users and is thus indicative of a user's specific verbiage, the system may determine that any instances of this word used by the user is indicative of that user's specific intent.

The system may include user device 216. User device 216 may include a user interface used to display a data-sparse environment (e.g., real-time communication application 222). For example, real-time communication application 222 may be a customer support chatbot including displaying two communicating parties, user 218 and representative 220. On real-time communication application 222, user 218 may perform actions (e.g., user action 202) such as typing a message in text input field 212 or interacting via telephonic communication using microphone icon 208, and representative 220 may perform actions (e.g., representative action 204) such as responding to order questions, processing returns or providing order support or performing other customer support services. User 218 may trigger actions with button 214.

User 218 may perform user action 202 or representative 220 may perform representative action 204 such as sending a message. The system may identify a phrase entered by the user or the representative in the action such as a message sent by representative 220 to user 218 saying, "we need the confirmation number to process the return request." The system may determine that "confirmation number" is a subset of the phrase entered by representative 220.

The system may determine that the subset corresponds to a labeled subset in a plurality of labeled subsets stored on an external database. The external database may contain the plurality of labeled subsets and corresponding known intents of the user. The database may be based on an artificial intelligence model that is trained to determine that a respective labeled subset of the plurality of labeled subsets was used when the user had a respective known intent. The system may assign a known intent to representative 220 corresponding to the subset. For example, the known intent may be "identify order number."

The system may query local data on user device 216 or external data to identify relevant digital assets corresponding to the known intent (e.g., recommended digital assets 206). The user may be presented with previews of each recommended digital assets 206. The user may be able to select one of recommended digital assets 206 to view in an expanded frame using button 210. Selecting button 210 may display the document on user device 216 for user 218 and on a user device representative 220 is using (e.g., a smartphone, tablet, laptop, desktop computer, or another user device) simultaneously.

Figure 3:
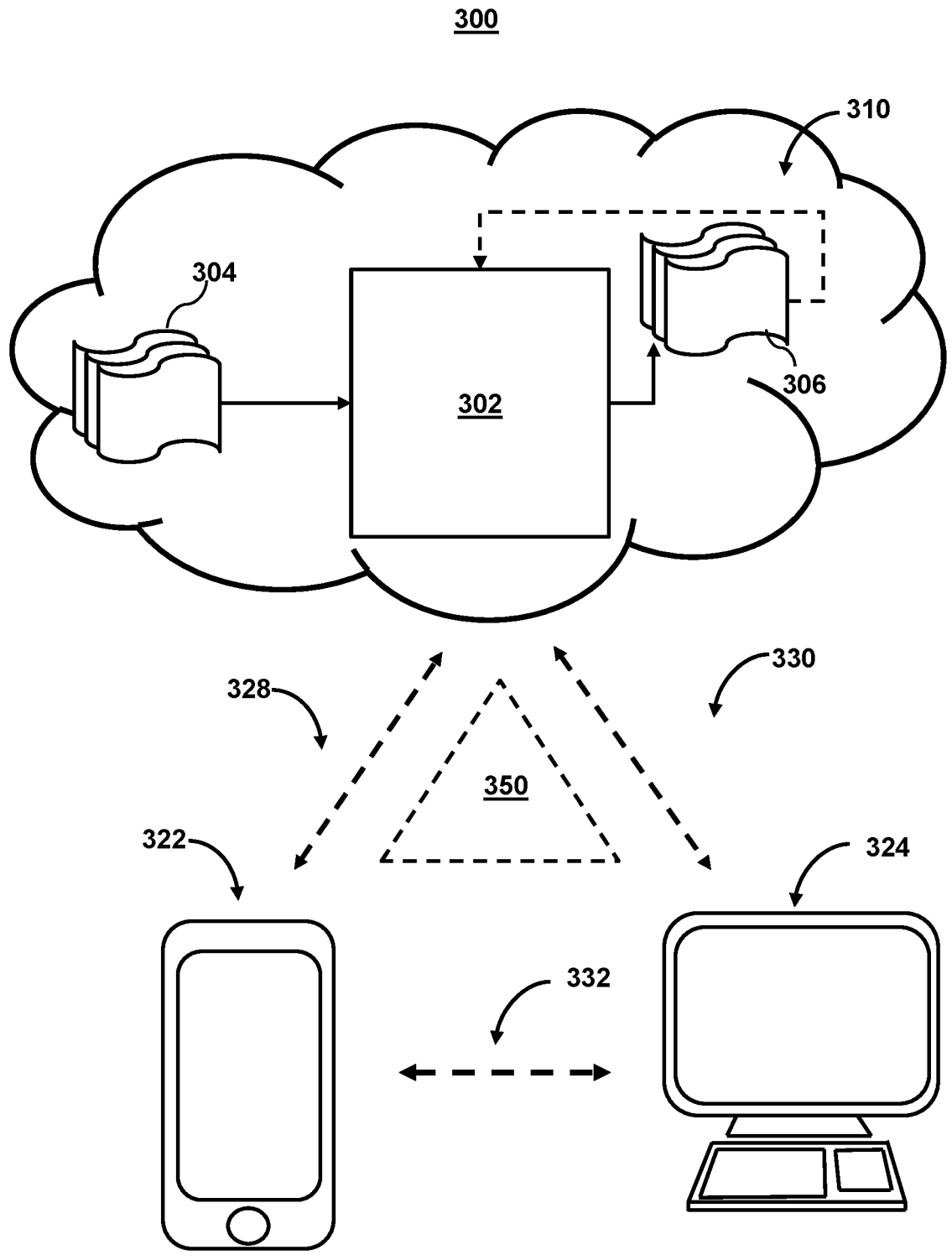
FIG. 3 shows illustrative components for a system used to identify user-specific verbiage that may relate to the specific intent of that user, in accordance with one or more embodiments.

FIG. 3 shows illustrative components for a system used to identify user-specific verbiage that may relate to the specific intent of that user, in accordance with one or more embodiments. For example, FIG. 3 may show illustrative components for determining an appropriate digital asset to recommend to a user in real-time. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice, or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include primary user devices (e.g., user device 216), a model (e.g., model 108), or secondary user devices (e.g., a user device for representative 220). Cloud components 310 may access a known intent database (e.g., database 106), multiple reference databases (e.g., databases 114), data associated with a primary user device (e.g., data associated with user device 216), or data associated with a secondary user device (e.g., data associated with a user device for representative 220).

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a respective known intent).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a classification of relevant or not relevant, a classification of is a respective known intent or not a respective known intent).

In some embodiments, the model (e.g., model 302) may automatically perform actions based on outputs 306. In some embodiments, the model (e.g., model 302) may not perform any actions. The output of the model (e.g., model 302) may be used to determine which digital assets to present users with in real-time.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
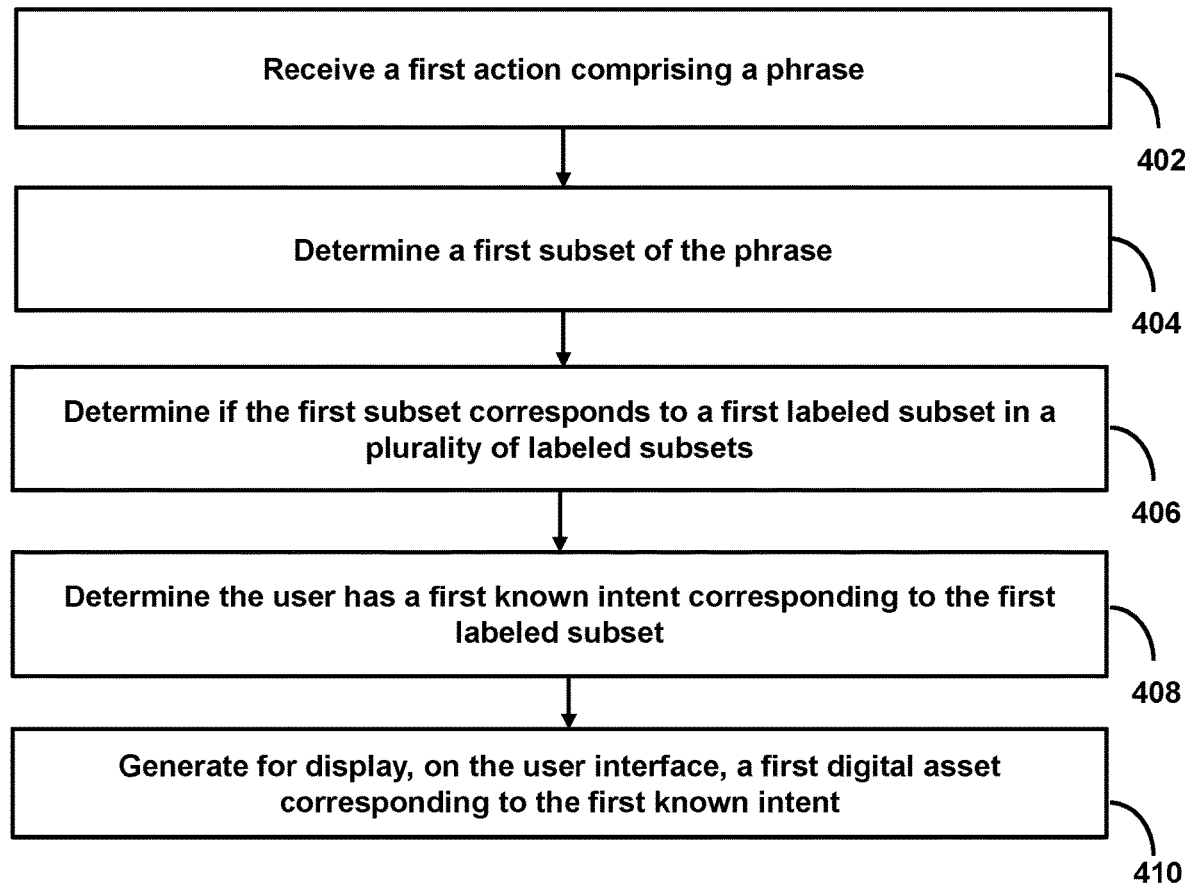
FIG. 4 shows a flowchart of the steps involved in identifying user-specific verbiage that may relate to the specific intent of that user, in accordance with one or more embodiments.

FIG. 4 shows a flowchart of the steps involved in identifying user-specific verbiage that may relate to the specific intent of that user, in accordance with one or more embodiments. For example, the system may use process 400 (e.g., as implemented on one or more system components described above) in order to enable a system to present digital assets for reference during an interaction in a data-sparse environment. Being able to provide digital assets at a relevant time increases productivity, organization, and collaboration and reduces frustration.

At step 402, process 400 (e.g., using one or more components described above) receives a first action comprising a phrase. For example, the system may receive, at a user interface, a first action, wherein the first action comprises a phrase entered by a user. For example, the user may enter a textual query into the data-sparse environment, or the user may speak into a mobile device in a data-sparse environment. The data-sparse environment may be programmed to determine a likely intent of the user and provide an appropriate response. To do so, the system may determine a likely intent of the user and generate content (e.g., a digital asset) based on the likely intent. By receiving a first action comprising a phrase, the system may be able to provide users with relevant digital assets based on the first action. By using the first action to initiate the process, the system may not rely on large datasets and instead generate digital asset recommendations in a data-sparse environment.

At step 404, process 400 (e.g., using one or more components described above) determines a first subset of the phrase. For example, the system may parse a text string entered by a user or spoken into a mobile device to determine one or more words or phrases that correspond to a user. For example, the system may parse the text string for a keyword or other identifier that is used by the user to indicate a likely intent. By determining a first subset of the phrase, the system may be able to provide digital asset recommendations to the user based on the subset of the phrase.

In some embodiments, the system may parse the phrase to identify a plurality of subsets and compare each of the plurality of subsets to the first labeled subset. For example, the system may determine whether the first subset corresponds to the first labeled subset in the plurality of labeled subsets by, parsing the phrase to identify a plurality of subsets, and comparing each of the plurality of subsets to the first labeled subset. For example, the system may determine a plurality of subsets within the text string. The system may iteratively compare each of the subsets to one or more labeled subsets that correspond to a known user intent. By parsing the phrase to identify a plurality of subsets and comparing each of the plurality of subsets to the first labeled subset, the system may identify a user's intent corresponding to a known user intent which may result in a more accurate digital asset recommendation.

In some embodiments, the system may determine a usage frequency of the respective labeled subset and determine the threshold frequency to apply to the respective labeled subset based on the usage frequency. For example, the system may determine a usage frequency of the respective labeled subset, wherein the usage frequency is specific to the user, and determine the threshold frequency to apply to the respective labeled subset based on the usage frequency. In some embodiments, the system may dynamically determine a threshold frequency for a respective labeled subset. For example, the system may determine that a particular respective labeled subset is frequently used by a specific user when the user has a particular intent. The system may then select a threshold frequency based on the user frequently using the subset when the user has that intent. The system may thus lower the threshold to make this respective labeled subset indicative of the user's intent even if other users also frequently use the same subset. By determining a usage frequency of the respective labeled subset and determining the threshold frequency to apply to the respective labeled subset based on the usage frequency, the system may tailor the digital asset recommendation to the unique speech pattern of the user thereby generating more accurate digital asset recommendations.

At step 406, process 400 (e.g., using one or more components described above) determines if the first subset corresponds to a first labeled subset in a plurality of labeled subsets. For example, the system may determine whether the first subset corresponds to a first labeled subset in a plurality of labeled subsets, wherein each labeled subset of the plurality of labeled subsets corresponds to one of respective known intents of the user, and wherein the plurality of labeled subsets is based on an artificial intelligence model that is trained to: determine that a respective labeled subset of the plurality of labeled subsets was used when the user had a respective known intent, determine that the respective labeled subset was not used at a threshold frequency by other users, and based on the respective labeled subset not being used at the threshold frequency by other users, assign the respective labeled subset as corresponding to the respective known intent for the user. For example, the system may label a subset with a known intent of the user. In such a case, the system may maintain a database of the known intents as well as the subset that corresponds to these known intents. For example, the system may determine that a user had a respective known intent based on one or more user inputs of a user during a device session. For example, the system may filter out commonly used terms, which may apply to numerous different intents. By determining if the first subset corresponds to a first labeled subset in a plurality of labeled subsets, the system may eliminate any weighting based on terms that may relate to different potential intents of the user.

In some embodiments, the system may receive, a second action, determine a second subset of the additional phrase, compare the second subset to a user-selected intent identifier, and determine that the user has a second intent corresponding to the user-selected intent identifier. For example, the system may receive, at the user interface, a second action, wherein the second action comprises an additional phrase entered by a user, determine a second subset of the additional phrase, compare the second subset to a user-selected intent identifier, and in response to comparing the second subset to the user-selected intent identifier, determine that the user has a second intent corresponding to the user-selected intent identifier. In some embodiments, the system may receive user inputs that correspond to user-selected intent identifiers. These virtual hotkeys or links may allow a user to specifically access particular content. By receiving, a second action, determining a second subset of the additional phrase, comparing the second subset to a user-selected intent identifier, and determining that the user has a second intent corresponding to the user-selected intent identifier, the system may ensure that the user can access the relevant digital assets in real-time.

In some embodiments, the system may receive a third action, comprising a user request to create the user-selected intent identifier, receive a fourth action comprising a user input of a user-selected intent, and receive a fifth action comprising a user input of the user-selected intent identifier. For example, the system may receive, at the user interface, a third action, wherein the third action comprises a user request to create the user-selected intent identifier (e.g., a user requests to create an intent identifier such as "Q3 scoreboard" to mean show the Q3 earnings report), receive a fourth action comprising a user input of a user-selected intent (e.g., user inputs into the system a digital asset called Q3 earnings report), and receive a fifth action comprising a user input of the user-selected intent identifier (e.g., the user uses "Q3 scoreboard" in the data-sparse environment). In some embodiments, the user-selected intent identifiers may be selected by a user. For example, the system may receive user selections of both an intent of the user (e.g., what content digital asset, etc.) as well as a user-selected intent identifier for that intent (e.g., a user may input a keyword or other identifier that indicates to the system that the user has a particular intent). By receiving, a third action, comprising a user request to create the user-selected intent identifier, receiving a fourth action comprising a user input of a user-selected intent, and receiving a fifth action comprising a user input of the user-selected intent identifier, the system may be able to provide more relevant or accurate digital asset recommendations for the user in the future based on the additional user actions.

In some embodiments, the system may retrieve a plurality of previous phrases entered by the other users during previous device sessions, parse the plurality of previous phrases to identify an average frequency at which the respective labeled subset appeared in the plurality of previous phrases, and compare the average frequency to the threshold frequency. For example, the system may determine that the respective labeled subset was not used at the threshold frequency by other users by, retrieving a plurality of previous phrases entered by the other users during previous device sessions, parsing the plurality of previous phrases to identify an average frequency at which the respective labeled subset appeared in the plurality of previous phrases, and comparing the average frequency to the threshold frequency. For example, in order to filter out commonly used terms, keywords, etc. used by other users, the system may only assign a labeled subset to unique terms, keywords, etc. that are specific (or below a certain threshold) to the user. To do so, the system may determine an average frequency at which a subset appears in text strings of other users. By retrieving a plurality of previous phrases entered by the other users during previous device sessions, parsing the plurality of previous phrases to identify an average frequency at which the respective labeled subset appeared in the plurality of previous phrases, and comparing the average frequency to the threshold frequency, the system may tailor the digital asset recommendations to the specific user by keeping track of the specific words the user uses when performing actions with a known intent.

In some embodiments, the system may generate for display a textual description of the respective known intent and receive a user confirmation of the respective known intent. For example, the system may determine that the respective labeled subset of the plurality of labeled subsets was used when the user had the respective known intent by, generating for display, on the user interface during a previous device session, a textual description of the respective known intent, and receiving a user confirmation of the respective known intent. For example, the system may determine that a user had a respective known intent based on one or more user inputs of a user during a device session. In some instances, the system may generate a textual description of the intent and query the user as to whether the intent is correct. For example, the system may determine that a user had a respective known intent to view financial documents sent last week. The system may confirm the respective intent with the user prior to presenting one or more financial documents sent in the week prior. By generating for display a textual description of the respective known intent and receiving a user confirmation of the respective known intent, the system may ensure that the respective known intent identified by the system is accurate which provides additional accuracy in determining relevant digital assets to recommend to the user.

In some embodiments, the system may determine a first time, determine a second time, determine a length of time between the first time and the second time, and determine that the respective labeled subset of the plurality of labeled subsets was used when the user had the respective known intent. For example, the system may determine that the respective labeled subset of the plurality of labeled subsets was used when the user had the respective known intent by, determining a first time, wherein the first time corresponds to a delivery time of the textual description, determining a second time, wherein the second time corresponds to a receipt time of the textual description, determining a length of time between the first time and the second time, and comparing the length of time to a threshold length of time to determine that the respective labeled subset of the plurality of labeled subsets was used when the user had the respective known intent. In some embodiments, the system may confirm that a user had an intent based on the user responding to a query that confirms the intent of the user. For example, this query may comprise a textual description of the intent (e.g., "Are you looking for your monthly statement?") or may comprise a description related to documents needed in pursuit of the intent (e.g., presenting a monthly statement in response to determining that a user's intent is to see the monthly statement). Additionally or alternatively, the system may monitor a user's actions following the display of a query and confirm the user's intent based on those actions. For example, the system may determine a length of time it took for a user to confirm (e.g., if a textual description or document does not match a user's intent, it may have confused a user and thus extended the time that the user takes to respond). By determining a first time, determining a second time, determining a length of time between the first time and the second time, and determining that the respective labeled subset of the plurality of labeled subsets was used when the user had the respective known intent, the system may automatically adapt and learn how to better identify respective known intents of the user which may help the system provide more accurate or relevant digital asset recommendations.

In some embodiments, the system may determine a first input number, determine a second input number, determine a difference between the first input number and the second input number, and compare the difference to a threshold difference to determine that the respective labeled subset of the plurality of labeled subsets was used when the user had the respective known intent. For example, the system may determine that the respective labeled subset of the plurality of labeled subsets was used when the user had the respective known intent by, determining a first input number, wherein the first input number corresponds to a total number of inputs from the user at a receipt time of the textual description, determining a second input number, wherein the second input number corresponds to the total number of inputs from the user at an end time of a current device session, determining a difference between the first input number and the second input number, and comparing the difference to a threshold difference to determine that the respective labeled subset of the plurality of labeled subsets was used when the user had the respective known intent. Additionally or alternatively, the system may monitor a user's actions following the display of a query and confirm the user's intent based on those actions. For example, the system may determine a number of inputs that a user entered following the display of a query. For example, if the number of inputs is large (e.g., above a threshold), the user may have needed to ask additional questions or search for other information (indicating that the query did not match the user's intent). By determining a first input number, determining a second input number, determining a difference between the first input number and the second input number, and comparing the difference to a threshold difference to determine that the respective labeled subset of the plurality of labeled subsets was used when the user had the respective known intent, the system may automatically adapt and learn how to better identify respective known intents of the user which may help the system provide more accurate or relevant digital asset recommendations.

At step 408, process 400 (e.g., using one or more components described above) determines that the user has a first known intent corresponding to the first labeled subset. For example, the system may, in response to determining that the first subset corresponds to the first labeled subset in the plurality of labeled subsets, determine the user has a first known intent corresponding to the first labeled subset. For example, the system may compare the labeled subset from the database with the plurality of labeled subsets to the subset of the phrase included in the user's action. If the labeled subset from the database matches the user's subset, the system may identify the user's known intent based on the known intent corresponding to the labeled subset in the database containing the plurality of labeled subsets. For example, the system may identify a user's subset as "financial results from the previous quarter" and associate it with subsets in the database such as "earnings statement for Q3," "fiscal report of last quarter," or "earnings from last quarter," and identify the known intent as "view quarterly earnings report." The system may use the known intent to generate for display a digital asset corresponding to the known intent (e.g., Q1 earnings report, Q2 earnings report, Q3 earnings report, or Q4 earnings report). By determining that the user has a first known intent corresponding to the first labeled subset, the system may ensure that relevant and accurate digital asset recommendations are presented to the user.

In some embodiments, the system may determine that the user had the respective known intent during a previous device session, retrieve a previous phrase that was entered by the user during the previous device session, and parse the previous phrase to identify the respective labeled subset. For example, the system may determine that the respective labeled subset of the plurality of labeled subsets was used when the user had the respective known intent by, determining that the user had the respective known intent during a previous device session, retrieving a previous phrase that was entered by the user during the previous device session, and parsing the previous phrase to identify the respective labeled subset. For example, the system may determine that a user had a specific intent during a device session. The system may determine that the user had the specific intent based on user inputs that confirm the intent. In response to this determination, the system may parse text strings entered by the user during that previous session to identify subsets of the text string. The system may then identify one or more of these subsets as a labeled subset that corresponds to the determined intent. By determining that the user had the respective known intent during a previous device session, retrieving a previous phrase that was entered by the user during the previous device session, and parsing the previous phrase to identify the respective labeled subset, the system may take into account previous device sessions to provide a more accurate and relevant digital asset recommendation to the user.

In some embodiments, the system may determine an input frequency of the respective labeled subset appearing in phrases entered by the user during previous device sessions during which the user had the respective known intent and compare the input frequency to a threshold input frequency. For example, the system may determine that the respective labeled subset of the plurality of labeled subsets was used when the user had the respective known intent by, determining an input frequency of the respective labeled subset appearing in phrases entered by the user during previous device sessions during which the user had the respective known intent, and comparing the input frequency to a threshold input frequency. In some embodiments, the system may determine that a respective labeled subset corresponds to a respective known intent based on the labeled subset appearing in text strings commonly entered by the user when the user has the respective known intent. For example, the system may determine whether or not the respective labeled subset appeared in a threshold number of the text strings entered by the user when the user had the respective known intent. By determining an input frequency of the respective labeled subset appearing in phrases entered by the user during previous device sessions during which the user had the respective known intent, and comparing the input frequency to a threshold input frequency, the system may take into account labeled subsets corresponding to a determined intent from previous device sessions to provide a more accurate and relevant digital asset recommendation to the user.

In some embodiments, the system may determine a probability that the user has the first known intent and compare the probability to a threshold probability. For example, the system may determine the user has the first known intent corresponding to the first labeled subset by, determining a probability that the user has the first known intent, and comparing the probability to a threshold probability. In some embodiments, the system may determine a probability that the user has the first known intent. The system may then determine whether the user has the intent based on comparing the probability to a threshold probability. By determining a probability that the user has the first known intent and comparing the probability to a threshold probability, the system may ensure that the known intent determined by the system meets a baseline to ensure that accurate and relevant digital asset recommendations are provided to the user.

At step 410, process 400 (e.g., using one or more components described above) generates for display, on the user interface, a first digital asset corresponding to the first known intent. For example, the system may generate for display, on the user interface, a first digital asset corresponding to the first known intent. For example, in order to filter out commonly used terms, keywords, etc. used by other users, the system may only assign labeled subsets to unique terms, keywords, etc. that are specific (or below a certain threshold) to the user. By generating for display, on the user interface, a first digital asset corresponding to the first known intent, the system may enable a system to present digital assets for reference during an interaction in a data-sparse environment. By enabling the system to present digital assets in real-time, the system may increase productivity, organization, and collaboration and reduce frustration.

In some embodiments, the system may retrieve a plurality of available digital assets, determine respective known intents corresponding to each of the plurality of available digital assets, and filter the plurality of available digital assets based on the respective known intents corresponding to the first known intent. For example, the system may generate for display, on the user interface, the first digital asset corresponding to the first known intent by, retrieving a plurality of available digital assets, determining respective known intents corresponding to each of the plurality of available digital assets, and filtering the plurality of available digital assets based on the respective known intents corresponding to the first known intent. In some embodiments, the system may have a plurality of available digital assets. The system may select one or more of the digital assets based on whether or not the digital asset corresponds to the intent of the user. By retrieving a plurality of available digital assets, determining respective known intents corresponding to each of the plurality of available digital assets, and filtering the plurality of available digital assets based on the respective known intents corresponding to the first known intent, the system may present accurate and relevant digital asset recommendations to the user based on the intent of the user and the intent corresponding to one or more of the digital assets.

In some embodiments, the system may retrieve a plurality of delivery formats corresponding to the first digital asset, retrieve a user profile corresponding to the user, and determine a delivery format of the plurality of delivery formats based on the user profile. For example, the system may generate for display, on the user interface, the first digital asset corresponding to the first known intent by, retrieving a plurality of delivery formats corresponding to the first digital asset, retrieving a user profile corresponding to the user, and determining a delivery format of the plurality of delivery formats based on the user profile. In some embodiments, the system may have a plurality of available formats for a digital asset corresponding to a user's intent. The system may select one or more of the delivery formats for the first digital asset based on a user (e.g., based on user preferences indicated by a user profile). By retrieving a plurality of delivery formats corresponding to the first digital asset, retrieving a user profile corresponding to the user, and determining a delivery format of the plurality of delivery formats based on the user profile, the system may provide a method of digital asset delivery preferred by the user which may improve productivity, organization, and collaboration as the digital asset is presented in a manner most convenient for the user.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, at a user interface, a first action, wherein the first action comprises a phrase entered by a user; determining a first subset of the phrase; determining whether the first subset corresponds to a first labeled subset in a plurality of labeled subsets, wherein each labeled subset of the plurality of labeled subsets corresponds to one of respective known intents of the user, and wherein the plurality of labeled subsets is based on an artificial intelligence model that is trained to: determine that a respective labeled subset of the plurality of labeled subsets was used when the user had a respective known intent; determine that the respective labeled subset was not used at a threshold frequency by other users; and based on the respective labeled subset not being used at the threshold frequency by other users, assign the respective labeled subset as corresponding to the respective known intent for the user; in response to determining that the first subset corresponds to the first labeled subset in the plurality of labeled subsets, determining the user has a first known intent corresponding to the first labeled subset; and generating for display, on the user interface, a first digital asset corresponding to the first known intent.

2. The method of the preceding embodiment, wherein determining whether the first subset corresponds to the first labeled subset in the plurality of labeled subsets further comprises: parsing the phrase to identify a plurality of subsets; and comparing each of the plurality of subsets to the first labeled subset.

3. The method of any one of the preceding embodiments, further comprising: receiving, at the user interface, a second action, wherein the second action comprises an additional phrase entered by a user; determining a second subset of the additional phrase; comparing the second subset to a user-selected intent identifier; and in response to comparing the second subset to the user-selected intent identifier, determining that the user has a second intent corresponding to the user-selected intent identifier.

4. The method of any one of the preceding embodiments, further comprising: receiving, at the user interface, a third action, wherein the third action comprises a user request to create the user-selected intent identifier; receiving a fourth action comprising a user input of a user-selected intent; and receiving a fifth action comprising a user input of the user-selected intent identifier.

5. The method of any one of the preceding embodiments, wherein determining that the respective labeled subset of the plurality of labeled subsets was used when the user had the respective known intent further comprises: determining that the user had the respective known intent during a previous device session; retrieving a previous phrase that was entered by the user during the previous device session; and parsing the previous phrase to identify the respective labeled subset.

6. The method of any one of the preceding embodiments, wherein determining that the respective labeled subset of the plurality of labeled subsets was used when the user had the respective known intent further comprises: determining an input frequency of the respective labeled subset appearing in phrases entered by the user during previous device sessions during which the user had the respective known intent; and comparing the input frequency to a threshold input frequency.

7. The method of any one of the preceding embodiments, wherein determining that the respective labeled subset was not used at the threshold frequency by other users further comprises: retrieving a plurality of previous phrases entered by the other users during previous device sessions; parsing the plurality of previous phrases to identify an average frequency at which the respective labeled subset appeared in the plurality of previous phrases; and comparing the average frequency to the threshold frequency.

8. The method of any one of the preceding embodiments, wherein determining that the respective labeled subset of the plurality of labeled subsets was used when the user had the respective known intent further comprises: generating for display, on the user interface during a previous device session, a textual description of the respective known intent; and receiving a user confirmation of the respective known intent.

9. The method of any one of the preceding embodiments, wherein determining that the respective labeled subset of the plurality of labeled subsets was used when the user had the respective known intent further comprises: determining a first time, wherein the first time corresponds to a delivery time of the textual description; determining a second time, wherein the second time corresponds to a receipt time of the textual description; determining a length of time between the first time and the second time; and comparing the length of time to a threshold length of time to determine that the respective labeled subset of the plurality of labeled subsets was used when the user had the respective known intent.

10. The method of any one of the preceding embodiments, wherein determining that the respective labeled subset of the plurality of labeled subsets was used when the user had the respective known intent further comprises:

determining a first input number, wherein the first input number corresponds to a total number of inputs from the user at a receipt time of the textual description; determining a second input number, wherein the second input number corresponds to the total number of inputs from the user at an end time of a current device session; determining a difference between the first input number and the second input number; and comparing the difference to a threshold difference to determine that the respective labeled subset of the plurality of labeled subsets was used when the user had the respective known intent.

11. The method of any one of the preceding embodiments, wherein generating for display, on the user interface, the first digital asset corresponding to the first known intent further comprises: retrieving a plurality of available digital assets; determining respective known intents corresponding to each of the plurality of available digital assets; and filtering the plurality of available digital assets based on the respective known intents corresponding to the first known intent.

12. The method of any one of the preceding embodiments, wherein generating for display, on the user interface, the first digital asset corresponding to the first known intent further comprises: retrieving a plurality of delivery formats corresponding to the first digital asset; retrieving a user profile corresponding to the user; and determining a delivery format of the plurality of delivery formats based on the user profile.

13. The method of any one of the preceding embodiments, wherein determining the user has the first known intent corresponding to the first labeled subset further comprises: determining a probability that the user has the first known intent; and comparing the probability to a threshold probability.

14. The method of any one of the preceding embodiments, further comprising: determining a usage frequency of the respective labeled subset, wherein the usage frequency is specific to the user; and determining the threshold frequency to apply to the respective labeled subset based on the usage frequency.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for generating digital asset recommendations in real-time communication applications using artificial intelligence models in data-sparse environments, the system comprising:

one or more processors; and a non-transitory, computer-readable medium comprising instructions that when executed by the one or more processors cause operations comprising:

receiving, at a user interface of a real-time communication application of a mobile device, a first action, wherein the first action comprises a phrase entered by a user;

determining a first subset of the phrase, wherein the first subset comprises one or more alphanumeric characters;

determining whether the first subset corresponds to a first labeled subset in a plurality of labeled subsets, wherein each labeled subset of the plurality of labeled subsets corresponds to one of respective known intents of the user, and wherein the plurality of labeled subsets is based on an artificial intelligence model that is trained to:

determine that a respective labeled subset of the plurality of labeled subsets was entered by the user into the real-time communication application when the user had a respective known intent;

determine that the respective labeled subset was not entered by other users into the real-time communication application at a threshold frequency when the other users had the respective known intent; and based on the respective labeled subset not being entered by other users into the real-time communication application at the threshold frequency when the other users had the respective known intent when the other users had the respective known intent, assign the respective labeled subset as corresponding to the respective known intent for the user;

in response to determining that the first subset corresponds to the first labeled subset in the plurality of labeled subsets, determining the user has a first known intent corresponding to the first labeled subset; and generating for display, on the user interface, a first digital asset corresponding to the first known intent, wherein the first digital asset comprises a textual description related to the first known intent.

2. A method for generating digital asset recommendations using artificial intelligence models in data-sparse environments, the method comprising:

receiving, at a user interface, a first action, wherein the first action comprises a phrase entered by a user;

determining a first subset of the phrase;

determining whether the first subset corresponds to a first labeled subset in a plurality of labeled subsets, wherein each labeled subset of the plurality of labeled subsets corresponds to one of respective known intents of the user, and wherein the plurality of labeled subsets is based on an artificial intelligence model that is trained to:

determine that a respective labeled subset of the plurality of labeled subsets was used when the user had a respective known intent;

determine that the respective labeled subset was not used at a threshold frequency by other users; and based on the respective labeled subset not being used at the threshold frequency by other users, assign the respective labeled subset as corresponding to the respective known intent for the user;

in response to determining that the first subset corresponds to the first labeled subset in the plurality of labeled subsets, determining the user has a first known intent corresponding to the first labeled subset; and generating for display, on the user interface, a first digital asset corresponding to the first known intent.

3. The method of claim 2, wherein determining whether the first subset corresponds to the first labeled subset in the plurality of labeled subsets further comprises:

parsing the phrase to identify a plurality of subsets; and comparing each of the plurality of subsets to the first labeled subset.

4. The method of claim 2, further comprising:

receiving, at the user interface, a second action, wherein the second action comprises an additional phrase entered by a user;

determining a second subset of the additional phrase;

comparing the second subset to a user-selected intent identifier; and in response to comparing the second subset to the user-selected intent identifier, determining that the user has a second intent corresponding to the user-selected intent identifier.

5. The method of claim 4, further comprising:

receiving, at the user interface, a third action, wherein the third action comprises a user request to create the user-selected intent identifier;

receiving a fourth action comprising a user input of a user-selected intent; and receiving a fifth action comprising a user input of the user-selected intent identifier.

6. The method of claim 2, wherein determining that the respective labeled subset of the plurality of labeled subsets was used when the user had the respective known intent further comprises:

determining that the user had the respective known intent during a previous device session;

retrieving a previous phrase that was entered by the user during the previous device session; and parsing the previous phrase to identify the respective labeled subset.

7. The method of claim 2, wherein determining that the respective labeled subset of the plurality of labeled subsets was used when the user had the respective known intent further comprises:

determining an input frequency of the respective labeled subset appearing in phrases entered by the user during previous device sessions during which the user had the respective known intent; and comparing the input frequency to a threshold input frequency.

8. The method of claim 2, wherein determining that the respective labeled subset was not used at the threshold frequency by other users further comprises:

retrieving a plurality of previous phrases entered by the other users during previous device sessions;

parsing the plurality of previous phrases to identify an average frequency at which the respective labeled subset appeared in the plurality of previous phrases; and comparing the average frequency to the threshold frequency.

9. The method of claim 2, wherein determining that the respective labeled subset of the plurality of labeled subsets was used when the user had the respective known intent further comprises:

generating for display, on the user interface during a previous device session, a textual description of the respective known intent; and receiving a user confirmation of the respective known intent.

10. The method of claim 9, wherein determining that the respective labeled subset of the plurality of labeled subsets was used when the user had the respective known intent further comprises:

determining a first time, wherein the first time corresponds to a delivery time of the textual description;

determining a second time, wherein the second time corresponds to a receipt time of the textual description;

determining a length of time between the first time and the second time; and comparing the length of time to a threshold length of time to determine that the respective labeled subset of the plurality of labeled subsets was used when the user had the respective known intent.

11. The method of claim 9, wherein determining that the respective labeled subset of the plurality of labeled subsets was used when the user had the respective known intent further comprises:

determining a first input number, wherein the first input number corresponds to a total number of inputs from the user at a receipt time of the textual description;

determining a second input number, wherein the second input number corresponds to the total number of inputs from the user at an end time of a current device session;

determining a difference between the first input number and the second input number; and comparing the difference to a threshold difference to determine that the respective labeled subset of the plurality of labeled subsets was used when the user had the respective known intent.

12. The method of claim 2, wherein generating for display, on the user interface, the first digital asset corresponding to the first known intent further comprises:

retrieving a plurality of available digital assets;

determining respective known intents corresponding to each of the plurality of available digital assets; and filtering the plurality of available digital assets based on the respective known intents corresponding to the first known intent.

13. The method of claim 2, wherein generating for display, on the user interface, the first digital asset corresponding to the first known intent further comprises:

retrieving a plurality of delivery formats corresponding to the first digital asset;

retrieving a user profile corresponding to the user; and determining a delivery format of the plurality of delivery formats based on the user profile.

14. The method of claim 2, wherein determining the user has the first known intent corresponding to the first labeled subset further comprises:

determining a probability that the user has the first known intent; and comparing the probability to a threshold probability.

15. The method of claim 2, further comprising:

determining a usage frequency of the respective labeled subset, wherein the usage frequency is specific to the user; and determining the threshold frequency to apply to the respective labeled subset based on the usage frequency.

16. A non-transitory, computer-readable medium comprising instructions recorded thereon that when executed by one or more processors causes operations comprising:

receiving, at a user interface, a first action, wherein the first action comprises a phrase entered by a user;

determining a first subset of the phrase;

determining whether the first subset corresponds to a first labeled subset in a plurality of labeled subsets, wherein each labeled subset of the plurality of labeled subsets corresponds to one of respective known intents of the user, and wherein the plurality of labeled subsets is based on an artificial intelligence model that is trained to:

determine that a respective labeled subset of the plurality of labeled subsets was used when the user had a respective known intent;

determine that the respective labeled subset was not used at a threshold frequency by other users; and based on the respective labeled subset not being used at the threshold frequency by other users, assign the respective labeled subset as corresponding to the respective known intent for the user;

in response to determining that the first subset corresponds to the first labeled subset in the plurality of labeled subsets, determining the user has a first known intent corresponding to the first labeled subset; and generating for display, on the user interface, a first digital asset corresponding to the first known intent.

17. The non-transitory, computer-readable medium of claim 16, determining whether the first subset corresponds to the first labeled subset in the plurality of labeled subsets further comprises:

parsing the phrase to identify a plurality of subsets; and comparing each of the plurality of subsets to the first labeled subset.

18. The non-transitory, computer-readable medium of claim 16, further comprising:

receiving, at the user interface, a second action, wherein the second action comprises an additional phrase entered by a user;

determining a second subset of the additional phrase;

comparing the second subset to a user-selected intent identifier; and in response to comparing the second subset to the user-selected intent identifier, determining that the user has a second intent corresponding to the user-selected intent identifier.

19. The non-transitory, computer-readable medium of claim 18, further comprising:

receiving, at the user interface, a third action, wherein the third action comprises a user request to create the user-selected intent identifier;

receiving a fourth action comprising a user input of a user-selected intent; and receiving a fifth action comprising a user input of the user-selected intent identifier.

20. The non-transitory, computer-readable medium of claim 16, wherein determining that the respective labeled subset of the plurality of labeled subsets was used when the user had the respective known intent further comprises:

determining that the user had the respective known intent during a previous device session;

retrieving a previous phrase that was entered by the user during the previous device session; and parsing the previous phrase to identify the respective labeled subset.

* * * * *